US010934692B2

(12) United States Patent
Poskin et al.

(10) Patent No.: US 10,934,692 B2
(45) Date of Patent: Mar. 2, 2021

(54) HYDRANT MOUNTING BRACKET

(71) Applicant: Prier Products, Inc., Grandview, MO (US)

(72) Inventors: Joseph E. Poskin, Prairie Village, KS (US); Scott P. Brady, Lake Winnebago, MO (US); William C. Seitter, Overland Park, KS (US)

(73) Assignee: Prier Products, Inc., Grandview, MO (US)

( * ) Notice: Subject to any disclaimer, the term of this patent is extended or adjusted under 35 U.S.C. 154(b) by 30 days.

(21) Appl. No.: 16/384,549

(22) Filed: Apr. 15, 2019

(65) Prior Publication Data

US 2020/0325661 A1 Oct. 15, 2020

(51) Int. Cl.
*E03B 9/02* (2006.01)
*F16L 5/00* (2006.01)

(52) U.S. Cl.
CPC ............... *E03B 9/025* (2013.01); *F16L 5/00* (2013.01); *Y10T 137/698* (2015.04); *Y10T 137/6977* (2015.04)

(58) Field of Classification Search
CPC ...... E03B 9/025; F16L 5/00; Y10T 137/6977; Y10T 137/698
USPC ................................................. 137/359, 360
See application file for complete search history.

(56) References Cited

U.S. PATENT DOCUMENTS

| 1,377,597 | A | * | 5/1921 | Mueller | F16K 27/12 285/46 |
| 1,436,667 | A | * | 11/1922 | Mueller | F16K 27/12 137/359 |
| 1,436,668 | A | * | 11/1922 | Mueller | F16K 27/12 285/46 |
| 6,006,784 | A | * | 12/1999 | Tsutsui | E03C 1/0403 137/359 |
| 8,261,766 | B1 | * | 9/2012 | Huang | E03C 1/042 137/359 |
| 8,763,175 | B2 | * | 7/2014 | Li | E03C 1/0402 4/677 |
| 8,997,272 | B2 | * | 4/2015 | Chen | E03C 1/0404 4/678 |
| 9,062,796 | B2 | * | 6/2015 | Horsman | E03C 1/0412 |
| 9,487,936 | B2 | * | 11/2016 | Sallah | E03C 1/0401 |
| 2010/0200077 | A1 | * | 8/2010 | Chan | G05G 1/10 137/15.18 |

* cited by examiner

*Primary Examiner* — Kevin F Murphy
*Assistant Examiner* — Jonathan J Waddy
(74) *Attorney, Agent, or Firm* — Erickson Kernell IP, LLC

(57) ABSTRACT

A mounting bracket for a hydrant that is fully concealed by the hydrant head. The mounting bracket is fastened to the structure and includes tabs which engage the hydrant head to tightly secure the hydrant to the structure. The hydrant head includes a structure engaging periphery such that the mounting screws are fully concealed and protected from the environment.

11 Claims, 3 Drawing Sheets

HYDRANT MOUNTING BRACKET

FIELD

The present invention generally relates to water hydrant mounting brackets, and more particularly, to a combination of a water hydrant head and mounting bracket with the water hydrant head completely covering the mounting bracket.

BACKGROUND

Hydrants, also known as sillcocks, hose bibbs, spigots, freezeless hydrants, faucets and water fixtures are known in the art. Hydrants are used to supply water to the outside of a building. Typically, a hydrant head is fastened to the outside of a structure by two or more screws. The screws are exposed and are aesthetically unappealing. Further, the exposed screw holes in the wood structure are a point for water incursion which may weaken the wood over time and rot.

SUMMARY

Embodiments of the invention are defined by the claims below, not this summary. A high-level overview of various aspects of the invention is provided here to introduce a selection of concepts that are further described in the Detailed Description section below. This summary is not intended to identify key features or essential features of the claimed subject matter, nor is it intended to be used in isolation to determine the scope of the claimed subject matter.

The present invention is directed to hydrant mounting bracket that is fully concealed by the hydrant head. The mounting bracket is fastened to the structure and includes tabs which engage the hydrant head to tightly secure the hydrant to the structure. The mounting screws are fully concealed and protected from the environment.

Other advantages of the present invention will become apparent from the following description taken in connection with the accompanying drawings, wherein is set forth by way of illustration and example an embodiment of the present invention.

DETAILED DESCRIPTION

Figure 1:
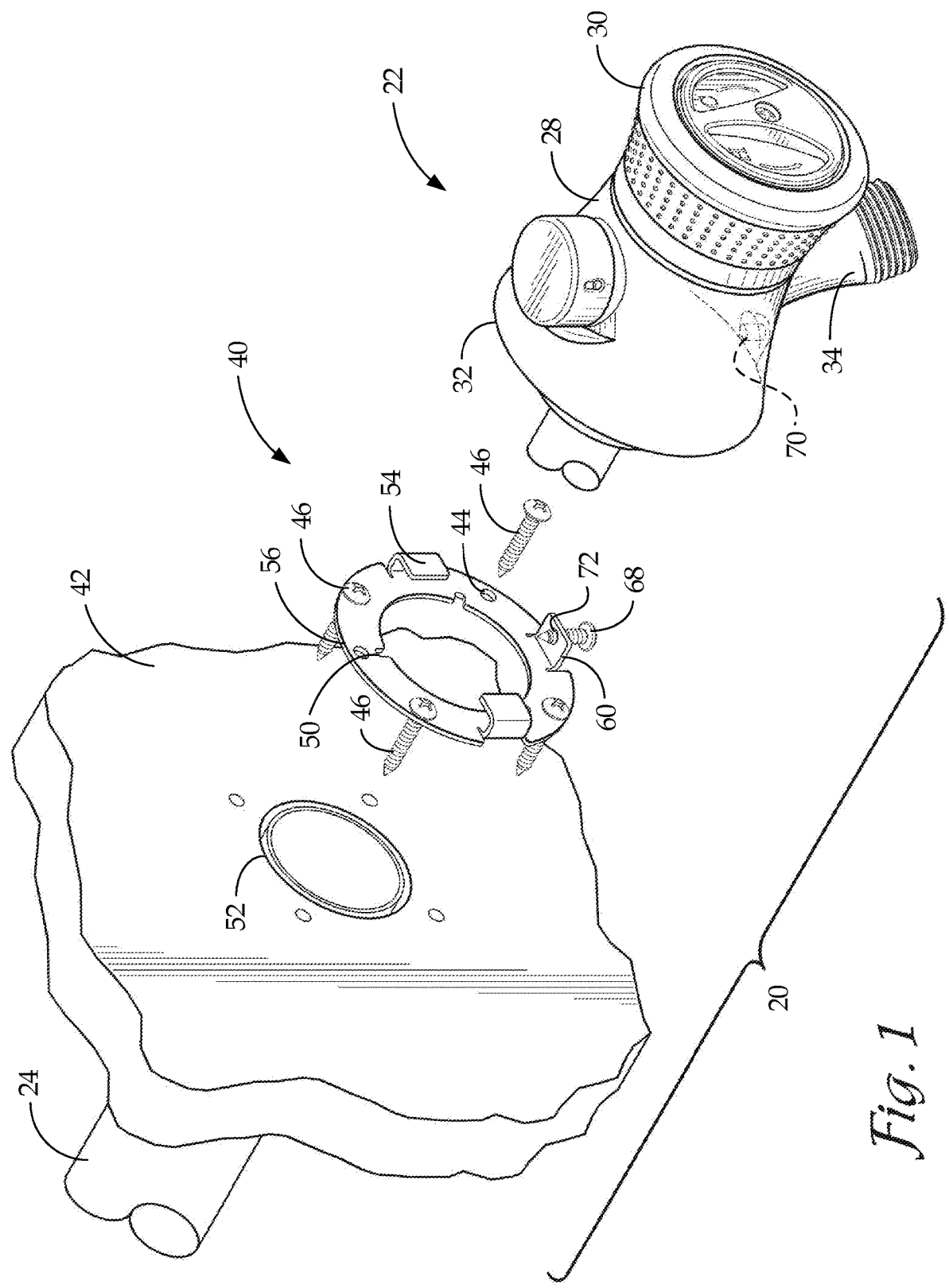
FIG. 1 is a partial exploded perspective view of a hydrant mounting bracket and hydrant of the present invention.
Figure 2:
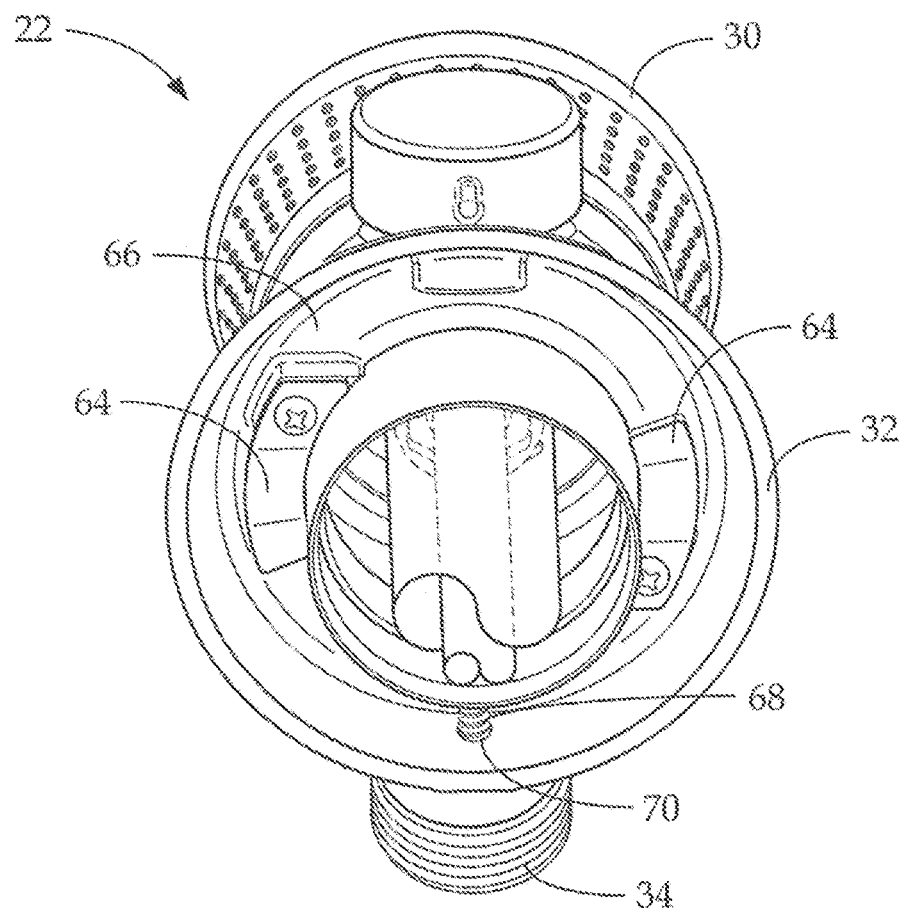
FIG. 2 is an enlarged partial perspective rear view of the head of the hydrant FIG. 1.
Figure 6:
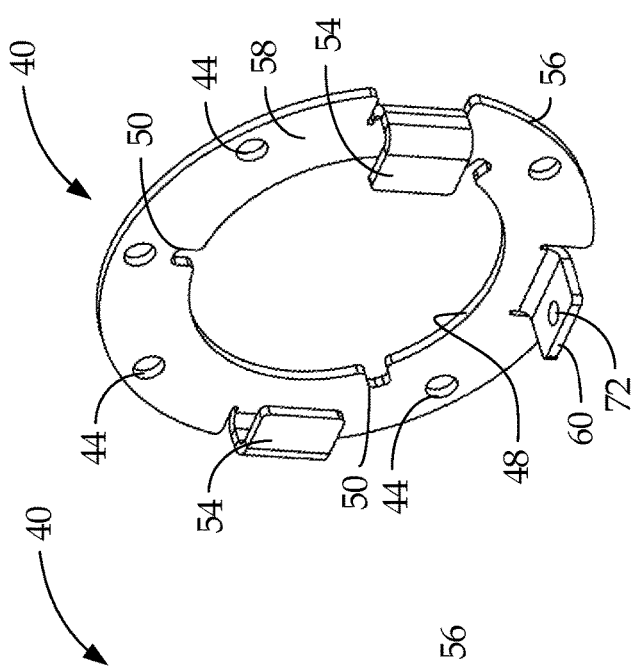
FIG. 6 is a perspective view of the head mounting bracket of FIG. 1.
Figure 4:
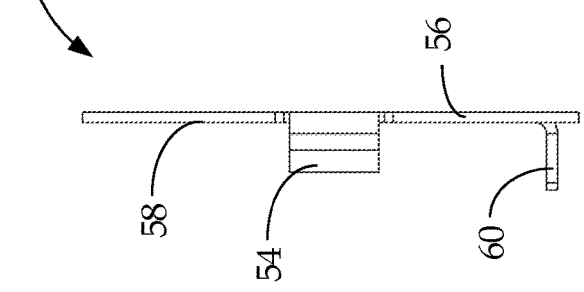
FIG. 4 is a side view of the head mounting bracket of FIG. 1.
Figure 3:
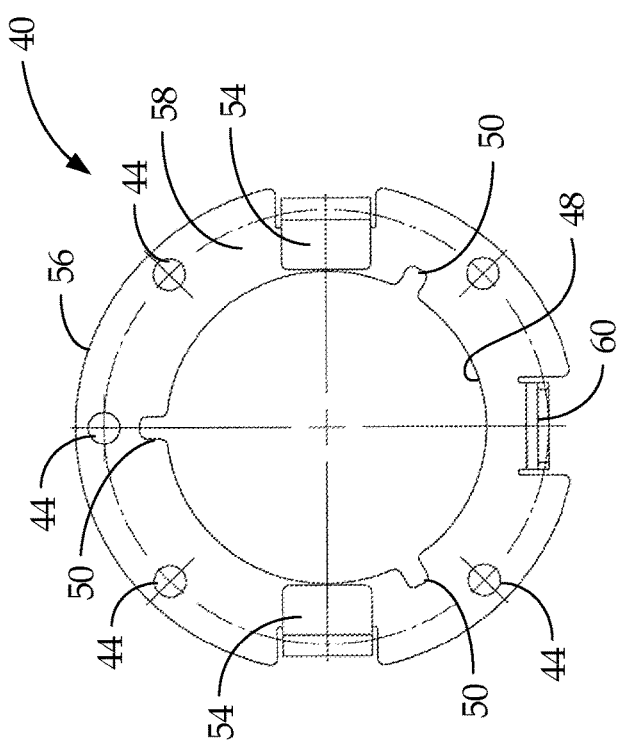
FIG. 3 is a plan view of the hydrant mounting bracket of FIG. 1.
Figure 5:
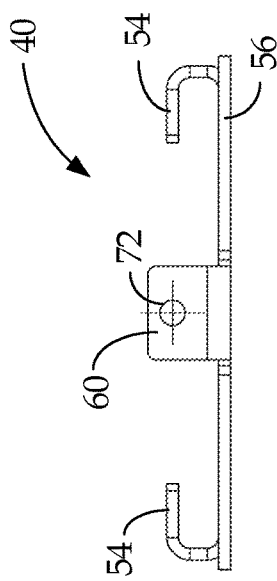
FIG. 5 is a bottom view of the head mounting bracket of FIG. 1.

Various embodiments of the present invention are disclosed herein, it is to be understood that the disclosed embodiments are merely exemplary of the invention, which may be embodied in various forms. Thus, any specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology used in the following description is for convenience in reference only and is not limiting. For example, the words "forwardly", "rearwardly", "upwardly", "downwardly", "upper", or "lower", for example, all refer to a position or relationship of the item to which the reference is made. The words "inwardly" and "outwardly" refer to directions toward and away from, respectively, the geometric center of the embodiment being designated and parts thereof. The terminology used herein may include the words specifically mentioned, derivatives thereof and words of a similar import. It is further understood that terminology such as the aforementioned directional phrases may be used to describe exemplary embodiments of the mixing hydrant as shown in the figures herein.

Referring to the figures, a hydrant mounting bracket of the present invention is generally indicated by reference numeral 40. A mounting bracket 40 is provided to mount a hydrant 20 to the side of a structure 42 such as a house. Hydrant 20 includes a head 22, and a tubular valve body 24. The head 22 includes a body 28, a flow control knob 30, a structure engaging periphery 32, and a spout 34.

The mounting bracket 40 is generally a circular ring with two or more evenly spaced screw holes 44 for receiving mounting screws 46 to secure the mounting bracket 40 to the structure 42. Along the interior periphery 48 of the mounting bracket 40 one or more alignment notches 50 may be included. The notches 50 may be evenly spaced around the interior periphery 48 to provide a visual aid to the installer in keeping the mounting bracket 40 centered and aligned with the aperture 52 in the structure 42.

The mounting bracket 40 includes a pair of head mounting tabs 54 positioned on opposite sides of the mounting bracket 40. The head mounting tabs 54 are generally C-shaped extending from the outer periphery 56 of the mounting bracket 40 to the inner periphery 48 in a plane in front of and parallel to a plane of the surface 58 of the mounting bracket 40. A head retaining tab 60 extends perpendicularly from the bottom of the mounting bracket 40.

When the mounting bracket 40 is installed on the structure 42 surrounding the aperture 52 using two or more screws or fasteners 46, the tubular valve body 24 of the hydrant 20 is inserted into the aperture 52 with the head 22 rotated at a 9 or 10 o'clock position until the rear edge 62 of the head 22 is flush with the surface of the structure 42. The head 22 is then rotated to a 12 o'clock position. A pair of retaining clips 64, mounted in a recess 66 in the back of the head 22, engage and are captured by the head mounting tabs 54 when the head 22 is rotated to the 12 o'clock position. A fastener 68 may be inserted through an aperture 70 extending into the recess 66 of the head 22 and engages an aperture 72 in the head retaining tab 60 to lock the head 22 in place. When mounted to the structure 42, the entire mounting bracket 40 and mounting screws 46 are all completely covered by the head 22.

While certain forms and embodiments of the vehicle carton and method for forming the same have been illustrated and described herein, the present invention is not to be limited to the specific forms or arrangement of parts described and shown, and that the various features described may be combined in ways other than those specifically described without departing from the scope of the present invention.

Having thus described the invention, what is claimed as new and desired to be secured by Letters Patent is as follows:

1. A combination of a water fixture having a head with a structure engaging periphery, and a head mounting bracket for mounting said head to a structure, said head mounting bracket comprising:
   a body having a center aperture, a mounting aperture for receiving a mounting fastener to secure said head mounting bracket to the structure, first and second head mounting tabs extending from said body and adapted to receive first and second retaining clips mounted in a recess of said head within said structure engaging periphery, and a head retaining tab having an aperture to receive a locking screw extending through a corresponding aperture in said head to secure said head to said head mounting bracket;
   wherein said first and second retaining clips engage said first and second head mounting tabs to secure said head of said water fixture against the structure;
   wherein said structure engaging periphery conceals said head mounting bracket.

2. The combination of claim 1 wherein said first and second head mounting tabs are C-shaped.

3. The combination of claim 1 further comprising a plurality of alignment notches along an inside perimeter of said center aperture.

4. The combination of claim 3 wherein said plurality of alignment notches are evenly spaced.

5. The combination of claim 1 wherein said body is a planar ring.

6. The combination of claim 1 wherein said first and second head mounting tabs are transversely spaced about the perimeter of said body.

7. The combination of claim 1 further comprising a plurality of mounting apertures in said body for receiving a plurality of mounting screws.

8. A combination of a water fixture having a head with a structure engaging periphery, and a head mounting bracket for mounting said head to a structure, said head mounting bracket comprising:
   a circular planar ring having a center aperture, a plurality of apertures for receiving mounting screws to secure said head mounting bracket to the structure, first and second head mounting tabs extending from said circular planar ring and adapted to receive first and second retaining clips mounted in a recess of said head within said structure engaging periphery, a plurality of alignment notches along an inside perimeter of said center aperture, and a head retaining tab having an aperture to receive a locking screw extending through a corresponding aperture in said head to secure said head in place;
   wherein said head is placed over said head mounting bracket and rotated;
   wherein upon rotation of said head, said first and second retaining clips engage said first and second head mounting tabs to secure said head of said water fixture against the structure;
   wherein said structure engaging periphery conceals said head mounting bracket and mounting screws.

9. The combination of claim 8 wherein said first and second head mounting tabs are C-shaped.

10. The combination of claim 8 wherein said plurality of alignment notches are evenly spaced.

11. The combination of claim 8 wherein said first and second head mounting tabs are transversely spaced about the perimeter of said circular planar ring.

\* \* \* \* \*